UNITED STATES PATENT OFFICE.

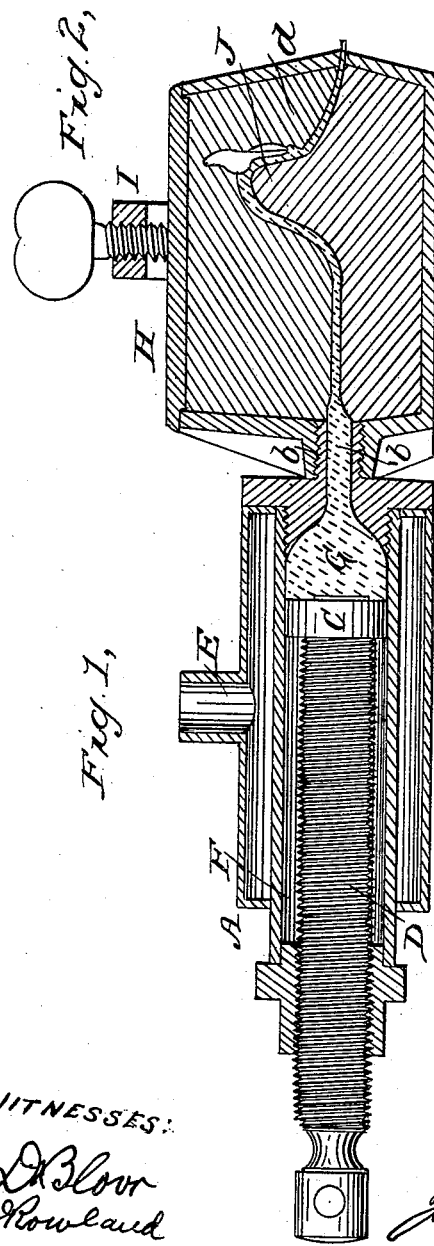

JOSEPH CHARLES HOWELLS, OF WASHINGTON, DISTRICT OF COLUMBIA.

IMPROVEMENT IN FILLING MOLDS WITH VULCANIZABLE GUMS.

Specification forming part of Letters Patent No. 39,481, dated August 11, 1863.

*To all whom it may concern:*

Be it known that I, JOSEPH CHARLES HOWELLS, of the city of Washington, in the District of Columbia, have invented a new and Improved Mode of Introducing Vulcanizable Gums into Molds or Flasks; and I do hereby declare that the following is a full and exact description thereof, reference being had to the accompanying drawings, and to the letters of reference marked thereon.

Figures 1 and 2 are in combination, Fig. 1 being a sectional elevation of the machine used, and Fig. 2 being a sectional elevation of a flask and mold, the whole represented in combination and showing my improved mode of introducing vulcanizable gums into molds or flasks.

The nature of my invention consists of introducing vulcanizable gums into molds or flasks by injection by means of any suitable apparatus, as will be more fully hereinafter described.

The ordinary mode of introducing vulcanizable gums into molds or flasks is often attended with great difficulty and uncertainty, loss of time and material, and a want of uniformity in results that in many of the arts prevents its general introduction in the place of the materials now used, which in themselves are more expensive and in many instances not so well adapted for the purpose as vulcanite. All this loss of time and material and general uncertainty is owing to the want of a suitable method for estimating the capacity of the mold or flask; hence the quantity of vulcanizable gum required and also some mode by which to determine when the mold or flask is perfectly filled. Practice alone enables the operator to arrive at anything like accurate and uniform results in filling molds or flasks with vulcanizable gum, and it is quite impossible to determine the exact quantity required, and then to introduce the gum into the mold or flask without damage to the work, the present practice being to guess at the quantity required.

In all cases where the molds are composed of friable materials the ordinary mode of filling them generally results in injury to the molds. Take, for example, the molds usually employed where vulcanizable gums are used as a base for artificial teeth. Being composed chiefly of plaster-of-paris, the very nature of the material requires the most careful treatment, for the success of the work depends upon the perfect adaptation of the plate or base to the alveolar ridge and a correct and exact articulation of the teeth. The present mode of introducing vulcanizable gums into molds for such purposes continually violates these very essential conditions, and not unfrequently the work is a total failure, the teeth being forced from their position in the mold or broken by the pressure (often unequal) that is required to force the gum into the mold and bring the halves of mold or flask together. In partial sets of teeth great exactness is required in clasping the remaining teeth and where vulcanizable gums are used, for the remaining teeth are molded in plaster, or plaster combined with some other friable material, which is liable to continual accident, and the dentist in that case is perplexed beyond measure, for should the mold not be filled the work is useless. Should it be too full, it destroys the articulation. Even when the proper quantity is used and the mold and gum are heated to admit of its more ready and easy adjustment, the too rapid and often unequal pressure to which it is subjected in closing the mold or flask is likely to result in injury to some portion of the work. In order to obviate all these defects, I reverse the order of filling the molds or flasks, and instead of first filling and then closing I close securely, and then fill the mold or flasks with vulcanizable gum in the following manner: I provide myself with a suitable pump or syringe, A, the piston C being operated by the screw D. The cylinder of the pump or syringe A may be provided with the jacket E, for the reception of steam, oil, or water, or their equivalents. Having filled the cylinder F with the vulcanizable gum G, I attach the discharging-point of the pump or syringe to the flask H (which is secured firmly by the clamp I, and contains a mold, J, suitably prepared) by means of the male and female screws $b\ b$ or any other equivalent device. The entire apparatus thus combined may then be plunged into water and subjected to 200° or 212° of heat Fahrenheit. At this temperature the vulcanizable gum is sufficiently soft and can readily be injected into the mold J by operating the piston C by the screw D. At various points grooves $d$ may be cut in the mold to facilitate the escape of the air from the mold, and consequently the injection of the gum. When the mold or flask is completely filled with the vulcanizable gum, it can be determined by the grooves $d$ being filled with the material used. It is not desirable to inject the gum at a lower temperature than 200° Fahrenheit, for it is then moved with difficulty, and from its stiffness and consistency is liable to abrade the surface of the mold, should it be of a friable nature. Nor should the temperature be raised to 228° Fahrenheit, which is the melting-point of sulphur, for then the gum after vulcanization will be mottled with dark spots, and what remains in the pump or syringe will contain sulphur in a crystallized state, the sulphur having separated from the gum while in a fluid state and crystallizing when allowed to cool. 212° Fahrenheit is a very desirable temperature, it being the point at which water boils, and is therefore determined readily while the escaping steam lubricates the surfaces of the molds or flasks, and thus facilitates the introduction of the gum into the mold. With the jacket E filled and the mold J saturated with water, a temperature of 212° Fahrenheit can soon be secured by means of a spirit-lamp, and with the apparatus secured to a suitable frame or support one or two minutes would be sufficient time in which to inject and fill any ordinary flask or mold with vulcanizable gum.

By any suitable device the entire apparatus might be submerged in boiling water and kept there during the introduction or injection of the mold or flask. When filled, the pump or syringe can be disconnected from the mold or flask, the hole in the flask closed in order to retain the gum in the mold, and the case is then ready for vulcanizing.

Vulcanizable gums for packing into flasks or molds are usually prepared in sheets of various thicknesses, and are protected from dirt and from sticking together by layers of cotton cloth being interposed between the sheets. My improvement admits of these gums being prepared in rolls or rods, thereby diminishing the cost of its preparation and enhancing its cleanliness, for it can be covered with tin foil or otherwise protected.

What I claim, and desire to secure by Letters Patent, is—

The introduction of vulcanizable gums into molds or flasks by injection, substantially as set forth, and by the apparatus herein described or its equivalent.

JOSEPH CHARLES HOWELLS.

Witnesses:
  DANL. ROWLAND,
  J. D. BLOOR.